US008596468B2

(12) United States Patent
Hua et al.

(10) Patent No.: US 8,596,468 B2
(45) Date of Patent: *Dec. 3, 2013

(54) COMPOSITE CAUSTIC SILICA GEL MANUFACTURING METHOD AND GELS MADE THEREBY

(75) Inventors: Duen-Wu Hua, Edgewood, MD (US); Gary W. Loock, Forest Hill, MD (US)

(73) Assignee: J.M. Huber Corporation, Atlanta, GA (US)

( * ) Notice: Subject to any disclaimer, the term of this patent is extended or adjusted under 35 U.S.C. 154(b) by 1114 days.

This patent is subject to a terminal disclaimer.

(21) Appl. No.: 11/823,264

(22) Filed: Jun. 27, 2007

(65) Prior Publication Data

US 2009/0001014 A1    Jan. 1, 2009

(51) Int. Cl.
*C01B 33/12* (2006.01)
*C01B 33/158* (2006.01)
*B01D 29/00* (2006.01)

(52) U.S. Cl.
USPC .............. 210/502.1; 210/198.1; 423/332; 423/333; 423/335; 423/338; 423/339

(58) Field of Classification Search
None
See application file for complete search history.

(56) References Cited

U.S. PATENT DOCUMENTS

| | | | | |
|---|---|---|---|---|
| 2,092,163 | A * | 9/1937 | Johnson | 423/333 |
| 2,408,656 | A | 10/1946 | Kirk | 252/309 |
| 2,763,533 | A | 9/1956 | Kenneth et al. | 423/330.1 |
| 3,794,712 | A | 2/1974 | Aboutboul et al. | 423/338 |
| 3,819,811 | A | 6/1974 | Aboutboul et al. | 423/338 |
| 3,959,174 | A * | 5/1976 | Winyall et al. | 423/338 |
| 4,148,864 | A | 4/1979 | Groth et al. | 423/335 |
| 4,279,879 | A | 7/1981 | Winyall et al. | 423/335 |
| 4,659,467 | A | 4/1987 | Spearman | 210/282 |
| 4,704,425 | A | 11/1987 | Lagarde et al. | 524/492 |
| 4,784,982 | A | 11/1988 | Usui et al. | 502/410 |
| 4,826,536 | A | 5/1989 | Raythatha et al. | 106/465 |
| 4,954,220 | A | 9/1990 | Rushmere | 162/168.8 |
| 5,219,660 | A | 6/1993 | Wason et al. | 428/403 |
| 5,234,673 | A | 8/1993 | McGill et al. | 423/338 |
| 5,342,876 | A | 8/1994 | Abe et al. | 524/493 |
| 5,352,271 | A | 10/1994 | Margaria et al. | 75/526 |
| 5,352,277 | A | 10/1994 | Sasaki | 106/6 |
| 5,419,888 | A | 5/1995 | McGill et al. | 423/338 |
| 5,503,820 | A | 4/1996 | Moffett et al. | 423/333 |
| 5,601,699 | A | 2/1997 | Degnan et al. | 208/114 |
| 6,375,914 | B1 | 4/2002 | Vangbo | 423/338 |
| 6,380,265 | B1 | 4/2002 | Pryor et al. | 516/85 |
| 6,438,867 | B1 | 8/2002 | Teich et al. | 264/42 |
| 6,689,437 | B1 | 2/2004 | Ubara et al. | 428/35.7 |
| 6,733,771 | B1 | 5/2004 | Minard et al. | 424/442 |
| 6,825,260 | B2 | 11/2004 | Sievers et al. | |
| 6,872,765 | B1 | 3/2005 | Betz et al. | 524/261 |
| 6,905,778 | B2 | 6/2005 | Tullos et al. | 428/480 |
| 6,969,692 | B2 | 11/2005 | Brady et al. | 502/66 |
| 6,998,050 | B2 | 2/2006 | Nakajoh et al. | |
| 7,250,214 | B2 | 7/2007 | Walter et al. | |
| 2002/0032272 | A1 | 3/2002 | Sievers et al. | 524/501 |
| 2003/0150811 | A1 | 8/2003 | Walter et al. | 210/656 |
| 2003/0175401 | A1 | 9/2003 | Nakajoh et al. | 426/601 |
| 2007/0020917 | A1 | 1/2007 | Brooke et al. | |
| 2008/0006012 | A1 | 1/2008 | Friday | 55/524 |

FOREIGN PATENT DOCUMENTS

| | | | |
|---|---|---|---|
| GB | 2269377 A | * | 2/1994 |
| WO | PCT/US2008/065613 | | 8/2008 |
| WO | PCT/US2008/065607 | | 10/2008 |
| WO | PCT/US2008/065609 | | 11/2008 |
| WO | WO/2009/002663 | | 12/2008 |
| WO | WO/2009/002664 | | 12/2008 |

OTHER PUBLICATIONS

Barrett et al., "The Determination of Pore volume and Area Distributions in Porous Substances. I. Computations from Nitrogen Isotherms," *J Am. Chem. Soc.*, 73:373-380 (Jan. 1951).
Brunauer et al., "Adsorption of Gases in Multimolecular Layers," *J Am. Chem. Soc.*, 60:309-319 (Feb. 1938).
U.S. Appl. No. 11/823,350, filed Jun. 10, 2009, Issue Notification.
U.S. Appl. No. 11/823,350, filed Mar. 11, 2009, Notice of Allowance.
U.S. Appl. No. 11/823,350, filed Nov. 12, 2008, Response to Office Action dated Jan. 28, 2008.
U.S. Appl. No. 11/823,350, filed Jan. 28, 2008, Non-Final Office Action.
U.S. Appl. No. 11/823,350, filed Dec. 31, 2007, Response to Restriction Requirement.
U.S. Appl. No. 11/823,350, filed Dec. 3, 2007, Restriction Requirement.
U.S. Appl. No. 11/823,436, filed Dec. 1, 2009, Response to Non-Final Office Action.

(Continued)

*Primary Examiner* — Krishnan S Menon
(74) *Attorney, Agent, or Firm* — Ballard Spahr LLP

(57) ABSTRACT

New silica gel materials and novel methods of producing such are provided. The method itself entails a manner of mixing the reactants together in a one-pot process such that the time required for aging is reduced without compromising the ability to target pore size production. In such a way, the pH of the reaction drives pore size development, thereby permitting a more efficient process to be followed in terms of expensive drying/heating steps being reduced timewise, if not altogether. Furthermore, in one embodiment, the resultant gel materials exhibit a certain pore size minimum while simultaneously exhibiting a degree of softness heretofore unavailable. As such, not only is this novel method more efficient in silica gel manufacture, but the resultant materials are completely novel as well. The gel materials made therefrom may be utilized in a variety of different end uses, such as cooking oil filtration, soft skin cleansers, dental abrasives, and the like. Methods of production and use, as well as the novel gel materials themselves, particularly caustic and composite gels, are thus encompassed within this invention.

6 Claims, No Drawings

(56) References Cited

OTHER PUBLICATIONS

U.S. Appl. No. 11/823,436, filed Sep. 4, 2009, Non-Final Office Action.
U.S. Appl. No. 11/823,436, filed Jun. 17, 2009, Response to Office Action / RCE.
U.S. Appl. No. 11/823,436, filed Apr. 9, 2009, Reponse to Office Action.
U.S. Appl. No. 11/823,436, filed Jan. 26, 2009, Final Office Action.
U.S. Appl. No. 11/823,436, filed Nov. 5, 2008, Response to Office Action.
U.S. Appl. No. 11/823,436, filed Oct. 6, 2008, Office Action.
Final Office Action dated Mar. 16, 2010 in U.S. Appl. No. 11/823,436.
Notice of Allowance in U.S. Appl. No. 11/823,436, dated Jun. 25, 2010.
Response to Office Action filed in U.S. Appl. No. 11/823,436, dated Jun. 14, 2010.

* cited by examiner

US 8,596,468 B2

COMPOSITE CAUSTIC SILICA GEL MANUFACTURING METHOD AND GELS MADE THEREBY

FIELD OF THE INVENTION

The present invention relates generally to new silica gel materials and novel methods of producing such. The method itself entails a manner of mixing the reactants together in a one-pot process such that the time required for aging is reduced without compromising the ability to target pore size production. In such a way, the pH of the reaction drives pore size development, thereby permitting a more efficient process to be followed in terms of expensive washing/filtering steps being reduced timewise, if not altogether. Furthermore, in one embodiment, the resultant gel materials exhibit a certain pore size minimum while simultaneously exhibiting a degree of softness heretofore unavailable. As such, not only is this novel method more efficient in silica gel manufacture, but the resultant materials are novel as well. The gel materials made therefrom may be utilized in a variety of different end uses, such as cooking oil filtration, soft skin cleansers, dental abrasives, and the like. Methods of production and use, as well as the novel gel materials themselves, particularly caustic and composite gels, are thus encompassed within this invention.

BACKGROUND OF THE INVENTION

Silica gels have been manufactured for many years and utilized in a plethora of different applications, ranging from abrasives to desiccants to thickeners and the like. The typical manufacturing process followed for silica gel production involves careful feeding of an acid and water glass solution through a narrow tube into a large cylindrical vessel. The gel will form nearly instantaneously so it is imperative that the feed be undertaken in such a fashion as to permit the resultant highly viscous gel product to form from the bottom of the cylinder and fill up the entire structure without clogging the feed system itself. Upon complete gel formation, the cylinder is then tipped downward and a piston is triggered to force the gel (in a large cylindrically shaped semi-solid form) out of the cylinder and through a series of mesh screens of differing gauge in order to "slice" the large gel mass into discrete cubic (or chunks) shapes. The resultant small gel cubes are then ammoniated and subjected to heating for a sufficient time to provide a desired pore size level and reinforcement simultaneously. The dried particles can then be milled to a desired size.

Classic silica gel manufacturing methods, involving the same general instantaneous gel production as discussed above, are disclosed within U.S. Pat. Nos. 3,794,712 and 3,819,811, to Aboutboul et al., as well as U.S. Pat. No. 4,148,864 to Groth et al. In more detail, hydrous silica gels are the result of the classical reaction of an alkali silicate with a mineral acid. Sulfuric acid is the most commonly used acid, although other mineral acids such as hydrochloric acid, nitric acid or phosphoric acid can be used. Sodium or potassium silicate may be used as the alkali silicate, with sodium silicate being preferred. The acid is added to the alkali silicate solution until a pH of less than about 5 is reached, with a pH of about 3 to 4.5 being most common. The alkali silicate solution can be mixed during this addition. The resulting product is a solid silica which includes the liquid phase. That is, the silica fully includes the water within its pores. For this reason that the solid phase contains the liquid phase, these silica materials have been termed silica hydrogels, with the dried silica being termed a silica gel. The mode of drying will determine whether the silica gel is a silica aerogel or a silica xerogel. Such silica hydrogels after synthesis have a water content of about 50 to 85 percent by weight.

Traditionally, in producing these silica hydrogels, the alkali silicate solution has an $SiO_2$ concentration of about 6 to 30 percent by weight. A stoichiometric excess of acid is used, thereby reaching the low preferred pH of 3 to 4.5. After the silica hydrogel is formed, it is washed with ammonia to remove excess salts and then dried (by any standard manner, such as oven drying, spray drying, flash drying, and the like) for a specified period of time to target pore sizes and pore volumes therein.

Due to the instantaneous gel formation effectuated within typical gel manufacturing equipment, there is no possibility for the introduction of extra caustic agent within the typical gel reaction process. If such an addition were made, the mineral acid reactant would be neutralized and no appreciable gel formation would occur. Conventionally, subsequent to the gel formation, the cylindrical mass is sliced into individual gel units; so gel unit would be modified to an appreciable degree upon exposure to a caustic material either. Thus, there has been no teaching of modification during gel formation steps previously.

As with other silica products, the generation of a specific pore size and particle size is the frequent goal of silica gel materials manufacture. Gels can be targeted for any such physical characteristic depending on the manufacturing method employed, in particular, as it pertains to the aforementioned traditional gel manufacturing method, the longer the aging time at a certain temperature will cause a certain level of pore size and pore volume to result. In general, the following of this aforementioned typical gel manufacturing procedure entails a large amount of heat over a long period of time in order to target the desired pore size. As such, the methods followed over the years have proven to be rather inefficient and costly. Likewise, the machinery and instrumentation required for such gel manufacture are, as the description above indicates, rather complex in nature and bulky, not to mention potentially prone to mechanical difficulties. Hence, a less complex method of manufacture with typical silica production apparatuses would be a preferable development for the silica gel manufacturer as well. Furthermore, since caustic additions have heretofore been nonexistent for gel formation methods, the introduction of any caustic materials that could impart a metal species to the gel surface to form a composite gel has not been disclosed within the prior art either. A method that enhances such composite formation (such as with desirable alkaline earth metal species) would thus be desired within the silica gel industry. Yet, to date, no such efficient and reliable process has been forthcoming.

BRIEF DESCRIPTION OF THE INVENTION

It is therefore one advantage of this novel process to produce a silica gel material through a process that does not require a first step of forming a semi-solid gel of low solids content, but actually entails a first step of producing gel materials in liquid phase form. Another advantage of this novel process is that the aging times required to provide a proper solid material is much shorter than that for the typical silica gel production method as well as the ability to avoid introduction of ammoniacal solvents. Yet another advantage of this novel process is the ultimate silica gel material exhibits the similar pore sizes as previously required of long aging times through pH modifications instead. An additional advantage with the present invention is the relative ease in salt removal provided with lower amounts of needed water for such a process step, thus providing a much more efficient method due to lower washing and filtration and shorter aging times than for traditional silica gel production procedures. Still another advantage is that this process provides a novel soft gel material with large pore sizes upon incorporation of proper high pH caustic during the manufacturing thereof. Yet another advantage is the ease of producing (in like efficient fashion) reliable composite gels from base components reacted with the resultant gels during gel production.

Accordingly, this invention encompasses a method of producing a silica gel material comprising the sequential process steps of a) initially producing a silicic acid sol through alkali metal silicate addition to a mineral acid, wherein the reaction occurs at a target pH level of between 1.5 and 4.0; b) quenching said silicic acid sol in a hot water medium to solidify said sol into a polysilicic acid gel; c) aging the resultant gel of step "b" in salt water; d) washing said aged gel of step "c" to remove excess salt; and e) drying said washed gel of step "d" to form a dry silica gel.

Also encompassed within this invention is a silica gel material exhibiting a Perspex abrasion value of at most 3 at an average particle size of at most 42 Å and further exhibiting a mean pore size of at least 20 Å. A filter medium and/or cleansing composition comprising such a novel silica gel material is encompassed as well. Furthermore, caustic gels of pH greater than 7.0 as well as composite silica gels of alkaline earth metal are encompassed within this invention as well.

DETAILED DESCRIPTION OF THE INVENTION

The term "Sol" is intended to encompass any suspension of fine silica particles in an aqueous media. The term "gel" is intended to encompass a three-dimensional network formed by silica particles, in either wet or dry form. The term "composite gel" is intended to encompass silica gel that includes with additional species present at least on the surface thereof in addition to the reaction product of sodium silicate and sulfuric acid.

The term "hot water medium" is intended to encompass an aqueous solvent present at a temperature of from about 65 to about 100° C.

All U.S. patents mentioned herein are hereby entirely incorporated by reference.

It has thus been determined, surprisingly, that acidic or caustic silica gel materials (otherwise known as polysilicic acid gel), as well as alkaline earth metal silica gel composites, may be produced in atypical silica gel manufacturing apparatuses, such as, as one example, within apparatuses primarily utilized for precipitated silica material production, through a process that entails the following sequential steps (for silica gels alone):

(1) making polysilicic acid in the reactor, (2) solidifying the polysilicic acid solution into gel form, using temperature and pH control in the subsequent tank, (3) aging the gel in salt water, (4) washing the gel with a press filter to remove excess and free salt, and (5) drying the pressed cake, by oven or flash dryer. In this process filter feed tank could be used for step (2) and (3). The resulting gel from this process usually remains acidic (pH<=6.5) and such a resultant gel exhibits excellent properties for certain filter media applications, among other end uses. Additionally, though a pH adjustment can be performed in step (2), to create a higher pH gel through caustic introduction during step (2), by subsequently controlling the pH of the final pH in step (3), a caustic gel (pH>7) with larger pore volume capacity and larger pore diameter can be produced as a result. If an alkali metal hydroxide is utilized as the caustic material (such as sodium hydroxide), the high solubility of the sodium species within the reaction medium creates a caustic environment in which the sodium cation washes from the gel during such a step. However, if an alkaline earth metal compound is utilized as the caustic additive (such as calcium hydroxide, i.e., slaked lime, or magnesium hydroxide), the low solubility properties of the metal species results in the ability of such metals to aggregate on the gel surface within the high pH environment, thus creating a metal/gel composite. As noted above, the introduction of a high pH caustic enables pore size, pore diameter, etc., modifications within the produced gel in order to avoid aging steps of long duration with high temperatures, thereby permitting a much quicker and more efficient manner of tuning the ultimate gel materials' physical properties; the ability to impart other properties in terms of caustic and/or composite structures is an unexpected added benefit of such an efficient gel production method. Thus, the pore volume and diameter are surprisingly tunable with differing levels of added caustic introduced within this second step, contrary to the past possibilities available from typical and traditional gel production processes. In comparison with acidic gel wet cakes, improved washing efficiency of the caustic gel wet cake is observed. Through the utilization of a vacuum filter and the same amount of water, caustic wet gel cakes can be washed with less than half of the time as compared to the acidic wet gel cake, and exhibits a lower final salt content. The basic silica gel should be beneficial as neutralizing high capacity absorbents for (acidic) contaminants encountered. For example, such gels are highly effective at absorbing undesirable components from acidic flue gases, such as sulfur oxides (SOx) and nitrogen oxides (NOx), as well as free fatty acids from used cooking oil formulations (as well as myriad other uses, such as, as one non-limiting possibility, purification during beer processing). The caustic utilized for the high pH gel synthesis methods herein include non-limiting examples such as sodium hydroxide and sodium silicate (due to availability and cost), although any reactant that provides a sufficiently high pH level (greater than 7.0, for instance) within the gel reaction may be utilized as well.

As for such composite silica gel materials, initially it is important to note that a silica co-gelled with metal hydroxide shows increased pore volume and pore diameter than those without such species present thereon. Calcium and/or magnesium composite gels have the potential in extra binding capabilities for different chemicals as compared to sodium hydroxide caustic gel as well. The said product is silicic acid gel (made through the same basic method noted above) co-gelled with slaked lime slurry and/or magnesium hydroxide slurry. After washing and flash drying, the resulting gel has higher pore volume (capacity) than the standard silica gels (and even more so than sodium caustic gel, which has better properties than standard silica gels as well), even with less amount of caustics added. The process of co-gelling is achieved by digesting slaked lime or magnesium slurry in a drop tank at high temperature first, then introducing the previously made liquid polysilicic acid solution therein (dropwise, preferably). In this way, the calcium hydroxide and/or magnesium hydroxide are intermingled and/or interact with the acidic silica solution and form a composite gel due to the low solubility levels (as noted above) of the calcium and magnesium ions. The hydroxide slurries in this invention serve as pore structure improvement additives in the process and as binding capabilities enhancer in the final products to various possible contaminants. Possible applications of these gels include $SO_2$ absorption in the flue gas from coal-fired power plants, among other acidic contaminants (NOx), as well as mercury removal from such flue gas streams. Such a silica-based product will also exhibit ability for reuse in various other applications subsequent to flue gas purification (as opposed to the inability of activated carbon to be usable for any further purposes).

As noted above, traditional gel synthesis has always been considered a tedious process which required special equipment for washing and dewatering as well as moving the hydrated gel. It is not uncommon for a typical gel synthesis to require washing/aging times of 4 to 24 Hrs to achieve the target salt levels. Theory dictates that gel washing is achieved by a diffusion process whereby water slowly migrates into the pore structure of the gel from outside-in, and in the process displaces salt outwards. Such a process is time consuming and costly. To combat this problem gel manufacturers typically achieve more effective washing by decreasing the gel agglomerated size thereby decreasing the mass transfer zone, or increasing the wash water temperature since these salts are in most cases more soluble at higher temperature, or possibly substituting the alkali metal silicate raw material with salt free organic silanes.

The present invention thus relates to a process of synthesizing a silica gel/silicic acid gel (either acidic or caustic in nature, as well as potentially a composite gel) of either predominantly micro or mesoporous properties which dewaters and washes at a pace unmatched by conventional gel synthesis thereby permitting a more efficient silica gel production method. Although the preferred embodiments described herein involve the utilization of typical precipitated silica production equipment, in actuality, any type of production scheme can be followed, including any type of manufacturing equipment, as long as certain process steps are included.

Such an inventive method was not a simple modification from typical gel synthesis procedures as there were significant technical hurdles to implementation and success for such a drastically modified process. For example, dewatering the gel may be a standard process step; however, to do so without deleteriously affecting the performance capabilities of the end product, particularly as a filter medium, was problematic. Furthermore, the amount of water necessarily required in order to thoroughly wash gel products in order to remove highly undesirable salt residues is generally very high. In order to provide an acceptable alternative gel production method, it would be required to utilize lower amounts of wash water, if possible. Additionally, and potentially most importantly, the ability to reduce such wash water amounts would inevitably require the production of small agglomerates of gel material. The problem in such an instance would be the ability to simultaneously provide such easily washed large amounts of small agglomerates while preventing the clumping of such agglomerates during dewatering and washing into non-pumpable masses of gel.

The preferred manufacturing equipment for this inventive method was typical silica precipitation equipment that was not significantly modified to any extent. As noted above, surprisingly, it was found that such atypical gel manufacturing equipment was possible for the production of a silica gel in a more efficient manner than traditional silica gel production processes, while also allowing for a tunable pore diameter product through pH control rather than through aging time differences, all without compromising the provision of a silica gel material that still exhibits sufficiently high gel-typical high surface area characteristics.

Such a manufacturing capability was permitted through the following method steps:
1. Making a silicic acid sol by Alkali metal silicate addition to a mineral acid to a target pH values of between 1.5 and 4.0 to form a quasi-stable sol. (pH control in this stage is critical as it is this reaction pH that dictates the pore size distribution in the final product)
2. Quenching the sol in a hot water medium to solidify the silicic acid sol into the more stable polysilicic acid gel by using temperature and pH control in the subsequent tank. The hot water medium essentially provides the multiple functions of
    i. Speeding up the gel process as a result of the increased temperature,
    ii. Diluting the salt present in the sol thereby requiring less washing less washing,
    iii. Having the gel form into discrete individual agglomerates which allowed for the
    migration of salt across a shorter distance thereby speeding up wash time;
3. Optionally introducing a caustic in the form of an alkali metal hydroxide or alkaline earth metal hydroxide,
4. Aging the gel in salt water,
5. Washing the gel with press filter to rid the excess salt,
6. Drying the pressed cake, and
7. Optionally milling the dried gel.

Such a process avoids silica gelation in the reactor, instead gelling the silica in the filter feed tank, thus enabling the gel to be made using common precipitation reactors. The transfer of the polysilicic acid solution into the filter feed tank can be varied, either through the utilization of pumps or reliance on gravity.

The inventive silica gels herein described may be produced within any type of silica manufacturing equipment as long as the aforementioned necessary process steps are followed. Typically, the inventive silica gel is prepared by mixing an aqueous alkali metal silicate solution, usually sodium silicate, and an aqueous mineral acid solution, usually sulfuric acid, to form a silica hydrosol and allowing the hydrosol to set to a hydrogel. The concentration of the acid solution is generally from about 5 to about 70 percent by weight and the aqueous silicate solution commonly has an $SiO_2$ content of about 6 to about 25 weight percent and a weight ratio of $SiO_2$ to $Na_2O$ of from about 1:1 to about 3.4:1. The reaction is generally carried out at temperatures of from about 15 to about 80° C. and typically is carried out at an ambient temperature (i.e., from about 20 to 25° C. at about 1 atmosphere pressure).

The relative proportions and concentrations of the reactants are selected so that the hydrosol contains from about 5 to about 20 weight percent $SiO_2$ and has a pH of from about 1 to about 11. When the quantity of acid reacted with the silicate is such that the final pH of the reaction mixture is acidic, typically from about 1 to 5, the resulting product is considered an acid-set hydrogel. The hydrogel granules are then washed with water or acidified water to remove residual alkali metal salts which are formed in the reaction. Acidified water is preferred and usually has a pH of from about 1.0 to about 5.0, preferably from about 2.5 to about 4.5. The acid may be a mineral acid such as sulfuric acid, hydrochloric acid, nitric acid, or phosphoric acid or a weaker acid such as formic acid, acetic acid, oxalic acid, citric acid, tartric acid, nitriloacetic acid, ethylene diamine-tetraacetic acid, or propionic acid. The water usually has a temperature of from about 80 to about 200° F. (27-93° C.), preferably about 90° C.). Generally, the hydrogel is washed for a period of from about 0.5 to about 8 hours.

The resulting gel in the filter feed tank is aged for a time of from 0.5 to 4 hours, at a temperature of from 65 to 100° C., and, depending on the resultant silica gel desired, at a pH level of either acidic (less than 6.5) or basic (above 7.0). After aging, the resultant gel is then reslurried and filtered via a press filter for washing and filtering. The pressed cake can be dried by any conventional means such as oven drying, tray drying, flash drying, or spray drying and ground in a fluid energy mill, hammer mill, or other known mill to the desired particle size. Generally, the ground gels have a weight median particle diameter of from about 1 to about 40 microns.

The resultant gels can be collected prior to washing and filtering and then introduced, as a polysilicic acid gel liquid, into a sample of calcium hydroxide, lime, magnesium hydroxide, and the like, to permit reaction to form a composite gel. The reaction may be at a temperature of from 65 to 100° C., for a time of from 0.5 to 4 hrs. Subsequently, the resultant product is washed for excess salt, as above, dried, as above, collected and possibly milled as well, to provide a finished composite gel material in powder, granulate, or other like form. Subsequently, the resultant product is washed for excess salt, as above, dried, as above, collected and possibly milled as well, to provide a finished composite gel material in powder, granulate, or other like form.

Silica gels made by this process typically will have BET surface areas of 350-1000 $m_2$/g with pore diameter of 17 Å-45 Å. In experiments where the reaction pH is maintained at below 1.75 before the quenching stage the pores were found to be predominantly if not completely micropore in size (<20 Å). In other experiments where the drop pH was maintained between 3 and 4.0 the final product was predominantly mesoporous (20 Å and 45 Å). As for the caustic gels, as well as the composite gels, the pore sizes ranged from about 60 to 200 Å.

This silica hydrogel is used in a preferred average particle size range of about 2 to 30 microns. This average particle size range is an average particle size by weight, as determined by Coulter Counter analysis. Average particle size by weight signifies that 50 percent by weight of the particles are above a designated particle size and 50 percent by weight are less than a given particle size. At average particle sizes below about 2 microns, the degree of polishing substantially decreases, although there does remain some polishing action. When the average particle size increases above about 30 microns, and particularly when above about 40 microns, the polishing degrades to an abrasion of the tooth enamel surface. Also, when the average particle size is 40 microns and above, there remains a gritty after-taste in the mouth of the user. This average particle size range of 2 to 30 microns is, therefore, a preferred range, with other sizes also being operable.

The silica gels of this invention are described in terms of their pore size distributions, adsorptive capacities, surface areas, pore volumes, average pore diameters, and bulk densities. The % solids of the adsorbent wet cake were determined by placing a representative 2 g sample on the pan of a CEM 910700 microwave balance and drying the sample to constant weight. The weight difference is used to calculate the % solids content. Pack or tapped density is determined by weighing 100.0 grams of product into a 250-mL plastic graduated cylinder with a flat bottom. The cylinder is closed with a rubber stopper, placed on the tap density machine and run for 15 minutes. The tap density machine is a conventional motor-gear reducer drive operating a cam at 60 rpm. The cam is cut or designed to raise and drop the cylinder a distance of 2.25 in. (5.715 cm) every second. The cylinder is held in position by guide brackets. The volume occupied by the product after tapping was recorded and pack density was calculated and expressed in g/ml.

The conductivity of the filtrate was determined utilizing an Orion Model 140 Conductivity Meter with temperature compensator by immersing the electrode epoxy conductivity cell (014010) in the recovered filtrate or filtrate stream. Measurements are typically made at a temperature of 15-20° C.

Surface area is determined by the BET nitrogen adsorption methods of Brunaur et al., *J. Am. Chem. Soc.*, 60, 309 (1938).

Accessible porosity has been obtained using nitrogen adsorption-desorption isotherm measurements. The BJH (Barrett-Joiner-Halender) model average pore diameter was determined based on the desorption branch utilizing an Accelerated Surface Area and Porosimetry System (ASAP 2010) available from Micromeritics Instrument Corporation, Norcross, Ga. Samples were out gassed at 150-200° C. until the vacuum pressure was about 5 µm of Mercury. This is an automated volumetric analyzer at 77° K. Pore volume is obtained at pressure $P/P_0=0.99$. Average pore diameter is derived from pore volume and surface area assuming cylindrical pores. Pore size distribution ($\Delta V/\Delta D$) is calculated using BJH method, which gives the pore volume within a range of pore diameters. A Halsey thickness curve type was used with pore size range of 1.7 to 300.0 nm diameter, with zero fraction of pores open at both ends.

The $N_2$ adsorption and desorption isotherms were classified according to the 1985 IUPAC classification for general isotherm types including classification of hysteresis to describe the shape and inter connectedness of pores present in the silicon based gel.

Adsorbent micropore area ($S_{micro}$) is derived from the Halsey isotherm equation used in producing a t-plot. The t-plot compares a graph of the volume of nitrogen absorbed by the adsorbent gel as compared with the thickness of the adsorbent layer to an ideal reference. The shape of the t-plot can be used to estimate the micropore surface area. Percent microporosity is then estimated by subtracting the external surface area from the total BET surface area, where $S_{micron}=S_{BET}-S_{ext}$. Thus % BJH microporosity=$S_{micro}/S_{BET} \times 100$. The surface areas and pore volumes were determined by the nitrogen adsorption method described in Brunauer, Emmett, and Teller, 60 J. Am. Chem. Soc. 309 (1938) (known as BET). The selective determination of the nitrogen pore volume within a given pore size range was made using the method described in Barrett, Joyner, and Halenda, 73 J. Am. Chem. Soc. 373 (1951).

Abrasivity was measured using a PERSPEX procedure. Such a method entailed the utilization of a brush head brushing a PERSPEX plate in contact with a suspension of the silica gel in a sorbitol/glycerol mixture. A slurry composition was first formed of 2.5 grams of the silica gel (or composite gel), 10.0 grams of glycerol, and 23.0 of a 70% sorbitol/30% water syrup. All components are weighed into a beaker and dispersed for 2 minutes at 1500 rpm using a simple stirrer. A 110 mm×55 mm×3 mm sheet of standard PERSPEX Clear Cast Acrylic sheet grade 000, manufactured by Imperial Chemical Industries Ltd, was used for the test. The test is carried out using a modified Wet Abrasion Scrub Tester Brush. In addition a weight of 400 g is attached to the brush assembly, which weighs 145 g, to force the brush onto the PERSPEX plate. The brush has a multi-tufted, flat trim nylon head with round ended filaments and medium texture. A Galvanometer is calibrated using a 45° Plaspec gloss head detector and a standard (50% gloss) reflecting plate. The Galvanometer reading is adjusted to a value of 50 under these conditions. The reading of the fresh PERSPEX plate is then carried out using the same reflectance arrangement. The fresh piece of PERSPEX was then fitted into a holder. Two $cm^3$ of the dispersed silica, sufficient to lubricate fully the brushing stroke, was placed on the plate and the brush head lowered onto the plate. The machine was switched on and the plate subjected to three hundred strokes of the weighted brush head. The plate was removed from the holder and all the suspension was washed off. It was then dried and re-measured for its gloss value. The abrasion value was the difference between the unabraded value and the value after abrasion.

To determine free fatty acid reductions in used cooking oils, initial and treated oils were analyzed by the official American Oil Chemists' Society methods for percent free fatty acids (Ca 5a-40).

Again, typical silica gel production methods require mixing finely divided silica gel with an aqueous ammoniacal medium in order to provide the desired pore size diameter distribution. The method employed within this invention avoids the need for such ammonia utilization. As such, the costs of not only the extra ammoniacal solvent as well as the time needed for washing and then drying the ammoniated gels afterwards, is avoided. Hence, again, unexpectedly, the ability to produce silica gels in an atypical gel production method as within this invention provides a significantly more efficient procedure without compromising any pore size or surface area properties.

The gels and composite gels made through this process also exhibit much softer abrasive properties than standard gels produced through typical gel production methods. Such new gels can be used within filter media (such as for absorption of noxious gases from air streams, removal of free fatty acids from cooking oils, as examples) or possibly as soft abrasives in skin or tooth cleaning compositions.

In terms of filter applications, it has been realized that silica-based compositions make excellent gas filter media. However, little has been provided within the pertinent prior art that concerns the ability to provide uptake and breakthrough levels by such filter media on a permanent basis and at levels that are acceptable for large-scale usage. Uptake basically is a measure of the ability of the filter medium to capture a certain volume of the subject gas; breakthrough is an indication of the saturation point for the filter medium in terms of capture. Thus, it is highly desirable to find a proper filter medium that exhibits a high uptake (and thus quick capture of large amounts of noxious gases) and long breakthrough times (and thus, coupled with uptake, the ability to not only effectuate quick capture but also extensive lengths of time to reach the filter capacity). The standard filters in use today are limited for noxious gases, such as ammonia, to slow uptake and relatively quick breakthrough times. There is a need to develop a new filter medium that increases uptake and breakthrough, as a result.

The closest art concerning the removal of gases such as ammonia utilizing a potential silica-based compound doped with a metal is taught within WO 00/40324 to Kemira Agro Oy. Such a system, however, is primarily concerned with providing a filter media that permits regeneration of the collected gases, presumably for further utilization, rather than permanent removal from the atmosphere. Such an ability to easily regenerate (i.e., permit release of captured gases) such toxic gases through increases of temperature or changes in pressure unfortunately presents a risk to the subject environment. To the contrary, an advantage of a system as now proposed is to provide effective long-duration breakthrough (thus indicating thorough and effective removal of unwanted gases in substantially their entirety from a subject space over time), as well as thorough and effective uptake of substantially all such gases as indicated by an uptake measurement. The Kemira reference also is concerned specifically with providing a dry mixture of silica and metal (in particular copper I salts, ultimately), which, as noted within the reference, provides the effective uptake and regenerative capacity sought rather than permanent and effective gas (such as ammonia) removal from the subject environment.

In a typical restaurant frying operation, large quantities of edible cooking oils or fats are heated in vats to temperatures of from about 315 to about 400° F. or more, and the food is immersed in the oil or fat for cooking. During repeated use of the cooking oil or fat the high cooking temperatures, in combination with water from the food being fried, cause the formation of free fatty acids (or FFA). An increase in the FFA decreases the oil's smoke point and results in increasing smoke as the oil ages. Increased FFA content also causes excessive foaming of the hot fat and contributes to an undesirable flavor or development of dark color. Any or all of these qualities associated with the fat can decrease the quality of the fried food.

Industrial frying operations involve the frying of large amounts of food for delayed consumption. Often, this is a continuous operation with the food being carried through the hot oil via a conveyor. Industrial fryers of meat and poultry must follow the strict FDA guidelines in terms of the length of time oils and fats may be used for deep fat frying purposes. Suitability of further or prolonged use can be determined from the degree of foaming during use or from color and odor of the oil and/or fat or from the flavor of the resultant fried food made therefrom. Fat or oil should be discarded when it foams over a vessel's side during cooking, or when its color becomes almost black as viewed through a colorless glass container. Filtering of used oil and/or fat is permitted, however, to permit further use, as well as adding fresh fat to a vessel and cleaning frying equipment regularly. Large amounts of sediment and free fatty acid content in excess of 2 percent are usual indications that frying fats are unwholesome and require reconditioning or replacement. Most industrial fryers use the 2% free fatty acid (FFA) limit, or less if mandated by their customers, for poultry as their main specification for oil quality, regardless of the food being fried.

In addition to hydrolysis, which forms free fatty acids, there occurs oxidative degeneration of fats which results from contact of air with hot oil, thereby producing oxidized fatty acids (or OFA). Heating transforms the oxidized fatty acids into secondary and tertiary by-products which may cause off-flavors and off-odors in the oil and fried food. Caramelization also occurs during the use of oil over a period of time, resulting in a very dark color of the oil which, combined with other by-products, produces dark and unappealing fried foods. Because of the cost resulting from the replacing of the cooking oils and fats after the use thereof, the food industries have searched for effective and economical ways to slow degradation of fats and oils in order to extend their usable life. The silica gels (particularly the caustic gels and composite gels) of this invention exhibit excellent ability to revoke FFA from such used cooking oils.

These novel silica gels may be combined with any number of other absorbents and/or additives for the purpose of permitting greater versatility in removing undesirable materials from certain streams and used oils. Thus, activated carbons, other silica materials (such as metal-doped precipitated silicas or silica gels, magnesium silicates, and the like) may be included within the same filter apparatus for such a purpose.

After production, if filter applications are desired, the gel or composite gel may then be compressed or compacted to form pellets of adequate structural integrity to withstand the compressive forces and abrasions experienced in a fixed bed filter without being crushed or reduced to fines that would reduce the efficiency of the filter. Various compression molding methods that provide the necessary degree of compaction of the mixture may be employed in the method of this invention. Suitable apparatus that may be used to compress the mixture includes, for example, compactors, briquetters, extruders, hydraulic presses, rotary mold presses, and the like. The size and/or shape of the pellets can be adapted to suit the catalytic application. The pellets may be circular or polygonal (either regular or irregular) in cross-section and may vary in diameter from about 1/16 to about 5/16 of an inch and from about 1/8 to about 1/2 of an inch in length. Pellets of similar size may be prepared, for example, in the form of saddles, pillows, hollow cylinders, or doughnuts. The term pellets is intended to cover compacted articles prepared by this invention regardless of their shape, whether solid or with a hole therein, and regardless of the method of compacting and includes pellets, extrusions, tablets, briquettes, and other shapes which have been subjected to the requisite compacting. Preferably, the mixture is compressed to form solid, cylindrical pellets.

PREFERRED EMBODIMENTS OF THE INVENTION

The following non-limiting examples are provided as guidelines of typical inventive production methods as well as inventive silica gels and composite gels themselves.
Silicic Acid Gel Production, both Acidic and Caustic

EXAMPLE I

Silicic Acid Gel 1867 cc of water were introduced into a 1 gallon stainless vessel. The pH thereof was adjusted to about 4 with $H_2SO_4$ and the formulation was then heated to 90° C. In a 1.5 liter reactor, 153.2 cc of room temperature sulfuric (11.4 wt %) acid were then introduced under sufficient agitation to stir with minimal splashing (~120 RPM). Sodium silicate (3.3 molar ratio, 24.7 wt %) was then added thereto at room temperature in two stages. In the first stage, silicate addition was at a rate of 11.4 cc/min until the resultant pH was close to 2.5. After 10 minutes, the RPM was raised to 250 and gradually increase to 300 over a period of several minutes. At that point, the second stage silicate addition was initiated at a rate of 1.7 cc/min until the resultant pH level was about 2.85. The silicate addition was then stopped and the pH thereof was manually adjusted to 3.00.

This reactor batch was then transferred into a 1-gallon vessel containing hot water. The temperature was then maintained at about 90° C. with no agitation for at least 45 minutes. The resultant gel slurry was then vacuum filtered with filter paper and 4000 cc of water with a subsequent air purge for 30 minutes after the wet gel cake cracked. The resulting gel wet cake was dried in an oven overnight.

EXAMPLE II

Caustic Gel 1867 cc of water were introduced into a 1 gallon stainless vessel. 10 cc of 10% NaOH solution were added to the water and heated to 90° C. The remaining steps were the same as followed in the EXAMPLE 1, above. The resultant gel was caustic in nature, however, due to the presence of sodium hydroxide within the reaction.

EXAMPLE III

Silicic Acid Gel

The same method was followed for EXAMPLE 1, above, except that the pH of the resultant product after the second stage of silicate addition was adjusted to 3.81.

The reactor batch was then transferred into a 1-gallon vessel containing hot water, all while maintaining the temperature at about 90° C. with no agitation initially. After 22 minutes, the aged reactor batch was agitated for 1 minute, as well as at the 44 minute point for 1 minute, both at 300 rpm. The resultant gel slurry was then vacuum filtered with filter cloth and 4000 cc of water, and air purged for 30 minutes after the wet gel cake cracked. The resulting gel wet cake was dried in the oven overnight.

EXAMPLE IV

Silicic Acid Gel, pH 1.75

A 2-gallon ambient reactor was charged with 2000 mls of 11.4% Sulfuric acid (sg 1.074). Sodium silicate [24.7% (3.3 MR)] was then added thereto at a rate of 40 mls/min to attain a pH of 1.75. The resulting sol was then placed in an oven maintained at 75° C. remained undisturbed for approximately 3 hours until fully gelled. The gel was then crumbled and washed by feeding water into the bottom inlet of a wash vessel and having the salt wash water overflow at the top. During the washing step, the gel was agitated periodically to effect better desalting to a conductivity of <1000 $\mu S/cm^2$. The resultant washed gel was then further dewatered by siphoning off the excess water and filtering the solids following by oven drying at 105° C. The dried gel can then be milled or compacted into granules.

EXAMPLE V

Acidic Gel, 400 Gallon Reactor 900 liters of water was introduced into a filter feed tank. The pH thereof was adjusted to 4 with 11.4% sulfuric acid and the resultant solution was then heated to 90° C. using steam sparging. The feed tank was then filled completely with cold water and cooled to about 30° C.

In a 400 gallon reactor, 150 liters of room temperature sulfuric (11.4 wt %) acid was introduced under sufficient agitation to stir, but with minimal splashing. Sodium silicate addition (3.3 molar ratio, 24.7 wt %) was then started at room temperature in two stages. The rate of silicate addition in the first stage was 3 liters/min until the pH level was about 2.5. The second stage of silicate addition then began at a rate of 1.5 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 10, and then the resultant wet cake was oven dried.

EXAMPLE VI

Caustic Gel via Silicate Addition

The same method as in EXAMPLE 1, above, was followed to form the reactor batch with a manually adjusted pH of 3.00. Then, the reactor batch was transferred in to a 1-gallon vessel containing hot water while maintaining the temperature at about 90° C. under no agitation initially. After 22 minutes, the aged batch was agitated for 1 minute at 500 rpm, followed by the introduction of 30 cc of 24.7% sodium silicate (3.3 MR). This new batch was then further agitated 22 minutes after the sodium silicate introduction for 1 minute at 500 rpm. The resultant caustic gel slurry was then vacuum filtered with filter cloth and 4000 cc of water and then air purged for 30 minutes after the wet gel cake cracked. The resulting gel wet cake was dried in an oven overnight.

EXAMPLE VII

Silicic Acid Gel 1020 cc of water were introduced within a 1-gallon stainless vessel and the pH thereof was then adjusted to about 4 with $H_2SO_4$. This aqueous solution was then heated to 90° C. In a 1.5 liter reactor, 153.2 cc of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of 11.4 cc/min until the pH level was about 2.5. After 10 minutes, the RPM was raised to 250 and gradually increased to 300 over a period of several minutes. Thereafter, the second stage silicate addition began at a rate of 1.7 cc/min until pH≈2.85 is reached, at which time silicate addition finished. The pH of the resultant batch was then manually adjusted to 3.00.

The resultant reactor batch was then transferred into a 1-gallon vessel containing hot water and maintained at a temperature of about 90° C. under no agitation initially. After 22 minutes, the aged reactor batch was agitated for 1 minute, as well as at the 44 minute point for 1 minute, both at 300 rpm. The resultant gel slurry was then vacuum filtered with filter cloth and 5000 cc of water and air purged for 30 minutes after the wet gel cake cracked. The resulting gel wet cake was dried in the oven overnight.

EXAMPLE VIII

Caustic Gel via Initial Silicate Presence 1020 cc of water were introduced within a 1-gallon stainless vessel and the pH thereof was then adjusted via the introduction of 10 cc of 24.7% sodium silicate solution. This aqueous solution was then heated to 90° C. In a 1.5 liter reactor, 153.2 cc of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of 11.4 cc/min until the pH level was about 2.5. After 10 minutes, the RPM was raised to 250 and gradually increased to 300 over a period of several minutes. Thereafter, the second stage silicate addition began at a rate of 1.7 cc/min until pH≈2.85 is reached, at which time silicate addition finished. The pH of the resultant batch was then manually adjusted to 3.00.

The resultant reactor batch was then transferred into a 1-gallon vessel containing hot water and maintained at a temperature of about 90° C. under no agitation initially. After 22 minutes, the aged reactor batch was agitated for 1 minute, as well as at the 44 minute point for 1 minute, both at 300 rpm. The resultant gel slurry was then vacuum filtered with filter cloth and 5000 cc of water and air purged for 30 minutes after the wet gel cake cracked. The resulting gel wet cake was dried in the oven overnight.

EXAMPLE IX

Caustic Gel

The same method as in EXAMPLE VIII was followed except that 5 cc of 10% NaOH solution were added to the initial aqueous solution, rather than 10 cc of 24.7% sodium silicate.

EXAMPLE X

Caustic Gel

The same method as in EXAMPLE IX was followed except that 12 cc of 10% NaOH was added to the initial aqueous solution.

EXAMPLE XI

Caustic Gel 1020 cc of water were introduced within a 1-gallon stainless vessel and the pH thereof was then adjusted via the introduction of 10 cc of 24.7% sodium silicate solution. This aqueous solution was then heated to 90° C. In a 1.5 liter reactor, 153.2 cc of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of 11.4 cc/min until the pH level was about 2.5. After 10 minutes, the RPM was raised to 250 and gradually increased to 300 over a period of several minutes. Thereafter, the second stage silicate addition began at a rate of 1.7 cc/min until pH≈2.85 is reached, at which time silicate addition finished. The pH of the resultant batch was then manually adjusted to 3.00.

The resultant reactor batch was then transferred into a 1-gallon vessel containing hot water and maintained at a temperature of about 90° C. under no agitation initially. After 22 minutes, the aged reactor batch was agitated for 1 minute, as well as at the 44 minute point for 1 minute, both times at 300 rpm. The resultant gel slurry was then vacuum filtered with filter cloth and 5000 cc of water and air purged for 30 minutes after the wet gel cake cracked. The resulting gel wet cake was dried in the oven overnight.

EXAMPLE XII

Caustic Gel 10 grams of the resultant caustic gel from EXAMPLE IX were slurried in 200 ml water, to which a sufficient amount of 10% NaOH was added to raise the slurry pH to about 7.26. After the resultant slurry was then dried, the pH was measured to be about 7.31. This material was then combined with an additional 5 grams of the EXAMPLE IX gel, reslurried, adjusted to a pH of about 9.32, and dried.

EXAMPLE XIII

Silicic Acid Gel, 2.5 MR 1020 cc of water were introduced within a 1-gallon stainless vessel and the pH thereof was then adjusted to about 4 with $H_2SO_4$. This aqueous solution was then heated to 90° C. In a 1.5 liter reactor, 202.9 cc of room temperature sulfuric (11.4 wt %) acid was then introduced under sufficient agitation to stir, but with minimal splashing (~120 RPM). Sodium silicate (2.5 molar ratio, 30.0 wt %) addition at room temperature was then initiated in two stages. The first stage involved a sodium silicate addition at a rate of 7.1 cc/min until the pH level was about 2.5. After 10 minutes, the RPM was raised to 250 and gradually increased to 300 over a period of several minutes. Thereafter, the second stage silicate addition began at a rate of 1.5 cc/min until pH≈2.85 is reached, at which time silicate addition finished. The pH of the resultant batch was then manually adjusted to 3.00.

The resultant reactor batch was then transferred into a 1-gallon vessel containing hot water and maintained at a temperature of about 90° C. under no agitation initially. After 22 minutes, the batch was agitated for 1 minute, as well as at the 44 minute point for 1 minute, both at 500 rpm. Immediately thereafter, the resultant gel slurry was then vacuum filtered with filter cloth and 5000 cc of water and air purged for 30 minutes after the wet gel cake cracked. The resulting gel wet cake was dried in the oven overnight.

EXAMPLE XIV

Caustic Gel 1020 cc of water were introduced within a 1-gallon stainless vessel and the pH thereof was then adjusted via the introduction of 10 cc of 24.7% sodium silicate solution. This aqueous solution was then heated to 90° C. In a 1.5 liter reactor, 153.2 cc of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of 11.4 cc/min until the pH level was about 2.5. After 10 minutes, the RPM was raised to 250 and gradually increased to 300 over a period of several minutes. Thereafter, the second stage silicate addition began at a rate of 1.7 cc/min until pH≈2.85 is reached, at which time silicate addition finished. The pH of the resultant batch was then manually adjusted to 3.00.

The resultant reactor batch was then transferred into a 1-gallon vessel containing hot water and maintained at a temperature of about 90° C. under constant agitation of 50 rpm for 45 minutes. The resultant gel slurry was then vacuum filtered with filter cloth and 5000 cc of water and air purged for 30 minutes after the wet gel cake cracked. The resulting gel wet cake was dried in the oven overnight.

EXAMPLE XV

Sodium Caustic Gel, 30 Gallon Reactor 79 liters of water were introduced into filter feed tank. 84 cc of 50% NaOH were then added thereto and the resultant solution was heated to 90° C.

In a 30 gallon reactor, 13 liters of room temperature sulfuric (11.4 wt %) acid was then introduced under sufficient agitation to stir, but with minimal splashing (~120 RPM). Sodium silicate (3.3 molar ratio, 24.7 wt %) addition at room temperature was then initiated in two stages. The first stage involved a sodium silicate addition at a rate of o.26 liters/min until the pH level was about 2.5. Thereafter, the second stage silicate addition began at a rate of 0.13 liters /min until pH≈2.85 is reached, at which time silicate addition finished. The pH of the resultant batch was then manually adjusted to 3.00.

The resultant reactor batch was then transferred into a filter feed tank and maintained at a temperature of about 90° C. under no agitation initially. After 22 minutes, the aged reactor batch was agitated for 1 minute, as well as at the 44 minute point for 1 minute, both at 300 rpm. The resultant gel slurry was then washed and filtered with a filter press (EIMCO), until the filtrate conductivity was below 3000 μmho. This sample was then air purged for 12 minutes and the resultant wet gel cake was spin flash dried (APV) until the cake cracked.

EXAMPLE XVI

Sodium Caustic Gel, 400 Gallon Reactor 1200 liters of water were introduced into a filter feed tank. 1.4 liters of 50% NaOH solution was added thereto and the resultant solution was then heated to 90° C. using steam sparging. The final volume was approximately 1350 liters within the filter feed tank.

In a 400 gallon reactor, 225 liters of room temperature sulfuric (11.4 wt %) acid was introduced under sufficient agitation to stir, but with minimal splashing. Sodium silicate addition (3.3 molar ratio, 24.7 wt %) was then started at room temperature in two stages. The rate of silicate addition in the first stage was 4.5 liters/min until the pH level was about 2.5. The second stage of silicate addition then began at a rate of 2 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 10, and then the resultant wet cake was then flash dried (Aljet ring flash dryer).

EXAMPLE XVII

Acidic Gel, 30 Gallon Reactor 79 liters of water were introduced into a filter feed tank. The pH was adjusted to 4 with sulfuric acid and the solution was heated to 90° C. Separately, in a 30 gallon reactor, 13 liters of room temperature sulfuric (11.4 wt %) acid was then added under sufficient agitation to stir with minimized splashing. Sodium silicate addition (3.3 molar ratio, 24.7 wt %) was then started at room temperature in two stages. The rate of silicate addition in the first stage was 0.26 liters/min until the pH level was about 2.5. The second stage of silicate addition then began at a rate of 0.13 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 12 minutes and the resulting gel wet cake was spin flash dried (APV).

EXAMPLE XVIIA

The same method was followed as in EXAMPLE XVIII, above, except that the resulting gel wet cake was oven dried.

EXAMPLE XVIII

Sodium Caustic Gel, 30 Gallon Reactor 79 liters of water were introduced into a filter feed tank. 84 cc of 50% NaOH solution were then added thereto and the solution was then heated to 90° C. In a 30 gallon reactor, 13 liters of room temperature sulfuric (11.4 wt %) acid were then introduced under sufficient agitation to stir, but with minimal splashing (as above). Sodium silicate addition (3.3 molar ratio, 24.7 wt %) was then started at room temperature in two stages. The rate of silicate addition in the first stage was 0.26 liters/min until the pH level was about 2.5. The second stage of silicate addition then began at a rate of 0.13 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 12 minutes and the resulting gel wet cake was spin flash dried (APV).

EXAMPLE XIX

Sodium Caustic Gel, 400 Gallon Reactor 800 liters of water was introduced into a filter feed tank. 0.95 liters of 50% NaOH solution was added thereto and the resultant solution was then heated to 90° C. using steam sparging. The final volume was approximately 960 liters within the filter feed tank.

In a 400 gallon reactor, 150 liters of room temperature sulfuric (11.4 wt %) acid was introduced under sufficient agitation to stir, but with minimal splashing. Sodium silicate addition (3.3 molar ratio, 24.7 wt %) was then started at room temperature in two stages. The rate of silicate addition in the first stage was 3 liters/min until the pH level was about 2.5. The second stage of silicate addition then began at a rate of 1.5 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 10, the resulting gel wet cake was diluted to about 7-8% solids, and then the resultant low solids wet cake was spray dried.

Composite Gel Synthesis

EXAMPLE XX

Calcium Co-Gel, 30 Gallon Reactor 79 liters of water were introduced into a filter feed tank. 192 cc of a slaked lime slurry (16.4% by weight) solution were then added thereto and the solution was then heated to 90° C. In a 30 gallon reactor, 13 liters of room temperature sulfuric (11.4 wt %) acid were then introduced under sufficient agitation to stir, but with minimal splashing (as above). Sodium silicate addition (3.3 molar ratio, 24.7 wt %) was then started at room temperature in two stages. The rate of silicate addition in the first stage was 0.26 liters/min until the pH level was about 2.5. The second stage of silicate addition then began at a rate of 0.13 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 12 minutes and the resulting gel wet cake was spin flash dried (APV).

EXAMPLE XXI

Magnesium Co-gel, 30 Gallon Reactor 79 liters of water were introduced into a filter feed tank. 62.2 cc of 50.8% $Mg(OH)_2$ slurry were then added thereto and the solution was then heated to 90° C. In a 30 gallon reactor, 13 liters of room temperature sulfuric (11.4 wt %) acid were then introduced under sufficient agitation to stir, but with minimal splashing (as above). Sodium silicate addition (3.3 molar ratio, 24.7 wt %) was then started at room temperature in two stages. The rate of silicate addition in the first stage was 0.26 liters/min until the pH level was about 2.5. The second stage of silicate addition then began at a rate of 0.13 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 12 minutes and the resulting gel wet cake was spin flash dried (APV).

EXAMPLE XXII

Magnesium Co-gel, 400 Gallon Reactor 800 liters of water was introduced into a filter feed tank. 0.72 liters of 50.8% $Mg(OH)_2$ slurry were then added thereto and the solution was then heated to 90° C. using steam sparging. The final volume of the contents of the feed tank were about 960 liters.

In a 400 gallon reactor, 150 liters of room temperature sulfuric (11.4 wt %) acid was introduced under sufficient agitation to stir, but with minimal splashing. Sodium silicate addition (3.3 molar ratio, 24.7 wt %) was then started at room temperature in two stages. The rate of silicate addition in the first stage was 3 liters/min until the pH level was about 2.5. The second stage of silicate addition then began at a rate of 1.5 liters/min until a pH of about 2.85 was reached. The silicate addition then stopped and the pH of the resultant batch was manually adjusted to 3.00.

The reactor batch was then pumped into the filter feed tank at a maintained temperature of about 90° C. without any agitation initially. After 22 minutes, the batch in the feed tank was agitated once for 1 minute, and again at the 44 minute point for 1 minute (both at 500 rpm). Immediately after the second agitation, the resultant gel slurry was washed and filtered with a filter press (EIMCO) until the filtrate conductivity was below 3000 μmho. The resultant product was then air purged for 10, the resultant wet cake wash and diluted to a solids content of 7-8%, and then the resultant wet cake was spray dried.

COMPARATIVE EXAMPLE

Comparative Caustic SG 408

15 grams of SG 408 (silica gel product from W. R. Grace) was slurried in 285 ml water, to which a sufficient amount of 10% NaOH was added to raise the slurry pH to about 9.02. After the resultant slurry was then dried, the pH was measured to be about 9.6.

Sample Analyses—Chemical and Physical Characteristics

Selected samples form the Examples above were then analyzed for different properties, including pore volume and diameter, hysteresis, surface area, washing times (to determine the length of time required to remove excess salts from the produced gels), abrasivity, and oil filitration capability, all in accordance with the test protocols listed previously. The results are in tabular form as follows:

TABLE I

Chemical Properties of Oven-Dried Gel Samples

| Inventive Example # | Surface area ($m^2/g$) | Pore volume (cc/g) | Pore diameter (Å) | Hysteresis | $Na_2SO_4$ |
|---|---|---|---|---|---|
| I | 715.4 | 0.42 | 23.2 | Small | 9.3% |
| II | 630.5 | 0.56 | 34.7 | Medium | 5.9% |
| III | 348 | 0.83 | 91 | Large | 1.1% |
| VI | 311 | 0.695 | 89.5 | Medium | 4.45% |

TABLE II

Chemical Properties of Gel Made by Modified Procedures.

| Inventive Example # | 5% pH | BET SA ($m^2/g$) | Total Pore volume (cc/g) | Average Pore diameter (Å) |
|---|---|---|---|---|
| VII | 4.42 | 651 | 0.38 | 23.6 |
| X | 9.73 | 306 | 0.38 | 49.6 |
| XI | 9.24 | 488.3 | 0.77 | 63.1 |
| XII | 9.26 | 359.5 | 0.91 | 101.2 |

TABLE III

Comparative Commercial Gel and Caustic Treated Gel Examples

| Sample | SG 408[1] (acidic) | Comparative Example SG 408 (caustic treated) |
|---|---|---|
| 5% pH | 3.5 | 9.6 |
| BET SA ($m^2/g$) | 651 | 367.9 |
| Total Pore volume (cc/g) | 0.41 | 0.37 |
| Average Pore diameter (Å) | 21.8 | 40.2 |

[1] Silica Gel from W.R. Grace Co.

The gels of Table I show similar properties to the commercial gel of Table III. As well, the caustic gels of Table II (examples X, XI, and XII) exhibited drastically different pore volumes and pore diameters than the simple post-gel caustic treatment of the commercially available gel, showing how the novel caustic gel production method permits production of such novel gel materials as well.

TABLE IV

Acidic Gels Produced with Different Molar Ratio Silicate Reactants

| | Inventive Example # | |
|---|---|---|
| | VII | XIII |
| 5% pH | 4.42 | 4.72 |
| BET SA ($m^2/g$) | 651 | 719.1 |
| Total Pore volume (cc/g) | 0.38 | 0.42 |
| Average Pore diameter (Å) | 23.6 | 23.4 |

Even with different mole ratio silicate reactants, the novel method provided similar gels as chemically analyzed to those available commercially as well.

TABLE V

Washing Time Comparisons for Quick Salt Removal

| Inventive Example # | ml. Volume of water In drop Tank | ml. Volume of Wash Water | Conductivity of Filtrate | % $Na_2SO_4$ in dry Product | *approximate filtration time (cake crack) |
|---|---|---|---|---|---|
| VII | 1020.6 | 5000 | 3.23 mS | 3.12% | 38 min. |
| VIII | 1020 | 5000 | 1.02 mS | 2.32/2.34% | 5 minutes |
| IX | 1020 | 5000 | 778 uS | 0.85% | 7 min 30 sec. |

These results show the benefits in terms of shortened washing times thereby providing a very efficient procedure for gel manufacture.

TABLE VI

Abrasivity Comparison of Acidic and Caustic gels

| Inventive Example # | Average Particle Size (microns) | Plate I.D. | Start Gloss | Avg. End Gloss | Avg. Gloss Change |
|---|---|---|---|---|---|
| VII | 34.28 | 1A | 89 | 66.2 | 22.8 |
| " | " | 1B | 88.9 | 67.2 | 21.7 |
| " | " | 1C | 89.4 | 68.1 | 21.3 |
| " | " | 1D | 89.2 | 68 | 21.2 |
| " | " | Average | 89.125 | 67.375 | Avg. Delta Gloss = 21.75 |

TABLE VI-continued

Abrasivity Comparison of Acidic and Caustic gels

| Inventive Example # | Average Particle Size (microns) | Plate I.D. | Start Gloss | Avg. End Gloss | Avg. Gloss Change | |
|---|---|---|---|---|---|---|
| XIV | 40.36 | 2A | 89.5 | 88.9 | 0.6 | |
| " | " | 2B | 89.5 | 86.8 | 2.7 | |
| " | " | 2C | 89.8 | 88.2 | 1.6 | |
| " | " | 2D | 89.9 | 89.1 | 0.8 | |
| " | " | Average | 89.675 | 88.25 | Avg. Delta Gloss = | 1.425 |

TABLE VII

Abrasion Test Comparing New Gel and Commercial Gel (SG 408)

| Sample I.D. | Average Particle Size (microns) | Mesh Size | Plate I.D. | Start Gloss | Avg. End Gloss | Avg. Gloss Change | |
|---|---|---|---|---|---|---|---|
| SG-408 | 15.3 | T-325 | 1A | 90.6 | 72.7 | 17.9 | |
| " | " | " | 1B | 90.2 | 73.6 | 16.6 | |
| " | " | " | 1C | 90.4 | 72.8 | 17.6 | |
| " | " | " | 1D | 90.7 | 74.1 | 16.6 | |
| " | | | Average | 90.475 | 73.3 | Avg. Delta Gloss = | 17.175 |
| Inventive Example V | 16.3 | T-325 | 2A | 91.1 | 89.9 | 1.2 | |
| Inventive Example V | " | " | 2B | 90.8 | 88.5 | 2.3 | |
| Inventive Example V | " | " | 2C | 90.3 | 88.9 | 1.4 | |
| Inventive Example V | " | " | 2D | 90.5 | 88.9 | 1.6 | |
| Inventive Example V | | | Average | 90.675 | 89.05 | Avg. Delta Gloss = | 1.625 |

Thus, gels of differing hardness (abrasivity) are possible via the novel manufacturing methods. As well, much softer gels from those available commercially are provided through these novel methods, particularly those caustic in nature. When coupled with the chemical properties listed above, it is evident that the caustic gels are totally different from such a commercially available gel.

TABLE VIII

Comparison of Gels Made Through Different Drying Steps

| Inventive Example # | pH dry | Pore volume cc/g | Surface area $m^2/g$ | Pore diameter Å | $Na_2SO_4$ % |
|---|---|---|---|---|---|
| XIV | 9.2 | 0.984 | 294.6 | 133.6 | 1.22 |
| XV | 8 | 1.12 | 425.5 | 105.6 | 1.65 |
| XVI | 8.7 | 1.32 | 444 | 118.8 | 2.5 |
| XVIII | 5.5 | 0.63 | 708.9 | 35.4 | 3.27 |
| XVIIIA | 5.5 | 0.46 | 676 | 27.4 | 3.27 |

TABLE IX

Comparison of Gels Made Through Different Drying Steps

| | Inventive Example # | | | |
|---|---|---|---|---|
| | XVIII | XXI | XIX | XXII |
| Reactor (gallon) | 30 | 400 | 30 | 400 |
| BET SA ($m^2/g$) | 243 | 279.4 | 444 | 329.6 |
| Total Pore volume (cc/g) | 0.92 | 1.16 | 1.32 | 1.23 |
| Average Pore diameter (Å) | 151.8 | 165.8 | 118.8 | 149.3 |

As compared to acidic gel, which has low pore volume (0.63 cc/g), small pore size and high surface area (709 $m^2/g$), both caustic gel and composite gel are basic and have higher pore volume, larger pore sizes and lower surface area. The composite gel exhibits an even higher total pore volume than the caustic gel (greater than 1 cc/g), while surprisingly and simultaneously exhibiting a larger surface area as well (greater than 350 $m^2/g$). As such, it is highly surprising that such a result is reached since it is counterintuitive that an increase in pore volume will result in a resultant increase in surface area as well. Generally, there will be a correlated reduction in surface area as pore volume increases. It is not understood how this result has been achieved, but at least the ability to control silica gel morphology through caustic pH exposure (rather than high temperature aging) has been shown through these examples. The water insoluble (e.g., calcium hydroxide) reactants provide significant differences from the water soluble types (e.g., sodium hydroxide) in terms of the final silica gel products made therefrom within the inventive method.

The biggest difference in properties between the caustic and composite gel is the relationship between pore diameter, pore volume and surface area. For caustic gel, both pore volume and diameter increase with large decrease of surface area. While the composite gels seem to maximize the pore volume, and have less impact on pore diameter and surface area. The different drying steps that can be followed thus provide possible availability of more efficient drying methods to produce effective gel materials.

Samples Analyses—Oil Filtration Capability

Testing was then undertaken to analyze the ability of certain composite and caustic gels to filter free fatty acids (FFA) from used cooking oils. The general method followed was to measure a known quantity of abused cooking oil, either highly abused (generally defined as oil used at typical frying temperatures more than four frying cycles) or lightly abused (generally defined as oil used at typical frying temperatures for one frying cycle) and heat to 310-330° F.; add a predetermined amount of absorbent (2-6%) and stir for 5 minutes; continue heating and stirring for exactly 5 minutes, after which filter the media through a 70 cm #4 Whatman filter paper supported on a appropriate Buchner funnel; time the filtration to get an indication of filtration rate from initial pouring to the disappearance of the excess oil from the bed under maximum vacuum; and collect the filtrate and measure the transmittance at 589 nm using 97% glycerin as a 100% transmittance standard. The results were as follows:

TABLE X

Oil filtration data - Highly Abused Cooking Oil

| Sample | BET Surface Area m2/g | Total Pore Vol cm3/g | Median Pore Dia (angstroms) | Particle Size (microns) | 5% pH | % T | % Color Change |
|---|---|---|---|---|---|---|---|
| Control (oil alone) | n/a | n/a | n/a | n/a | n/a | 44.4 | n/a |
| Britesorb ®[1] (6% usage) | 535 | 1.20 | 12 | 40 | 8.7 | 74 | 68 |
| Magnesol ®[2] (6% usage) | 400 | 0.88 | 95 | * | 8.5 | 69.8 | 57 |
| SG 408 (6% usage) | 750 | 0.35 | <25 | 60 | 6.5 | 51.4 | 16 |
| Inv. Ex. IV (6% usage) | 525 | 0.27 | 21 | 60 | — | 54.2 | 22 |
| Inv. Ex. XVI (6% usage) | 216 | 1.05 | 190 | 40 | 8.5 | 70.2 | 58 |
| Inv. Ex. XVII (6% usage) | 330 | 1.23 | 149 | 40 | 8.5 | 69.8 | 57 |
| Inv. Ex. XVI_(4% usage) | 216 | 1.05 | 190 | 40 | — | 61.8 | 39 |

[1] A silica gel material from PQ Corporation
[2] Magnesium Silicate from The Dallas Group
* Particle Sizes are listed commercially as between 20 and 75 microns
— no measurements taken

TABLE XI

Oil filtration data - Lightly Abused Cooking Oil

| Sample | % T | % Color Change | % Free Fatty Acid |
|---|---|---|---|
| Control (oil alone) | 60.8 | n/a | 0.880 |
| Britesorb ® (6% usage) | 77.2 | 27 | 0.2991 |
| Magnesol ® (6% usage) | 75.2 | 24 | 0.6844 |
| Inv. Ex. XIX (6% usage) | 74.2 | 22 | 0.619 |

TABLE XII

Oil Filitration Data - Lightly Abused Cooking Oil (Composite gel)

| Sample | % T | % Free Fatty Acid |
|---|---|---|
| Control (oil alone) | 70.2 | 2.34 |
| Inv. Ex. XXI (2% usage) | 69.2 | 2.03 |
| Inv. Ex. XXI (6% usage) | n/a | 0.32 |
| Inv. Ex. XX (6% usage) | 75.8 | 0.33 |

Thus, the inventive gels exhibit utility comparable to commercially available cooking oil filtration products. It is expected that such novel gels will exhibit excellent properties in other areas as well.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

What we claim is:

1. A caustic composite silica gel of pH greater than 7.0 exhibiting a pore volume of at least 1.00 cc/g and a surface area of at least 350 m$^2$/g.

2. The caustic composite silica gel of claim 1 wherein said gel includes at least one alkaline earth metal species thereon.

3. The gel of claim 2 wherein said at least one alkaline earth metal species is selected from the group consisting of calcium, magnesium, or both.

4. An oil filtration medium comprising at least one caustic composite silica gel as defined in claim 1.

5. An oil filtration medium comprising at least one caustic composite silica gel as defined in claim 2.

6. An oil filtration medium comprising at least one caustic composite silica gel as defined in claim 3.

* * * * *